US006616994B2

(12) United States Patent
Van Schaftingen et al.

(10) Patent No.: US 6,616,994 B2
(45) Date of Patent: Sep. 9, 2003

(54) FUEL TANK OR TUBING FOR FILLING THIS TANK

(75) Inventors: Jules-Joseph Van Schaftingen, Wavre (BE); Serge Dupont, Vilvoorde (BE)

(73) Assignee: Solvay (Société Anonyme), Brussels (BE)

( * ) Notice: Subject to any disclaimer, the term of this patent is extended or adjusted under 35 U.S.C. 154(b) by 0 days.

(21) Appl. No.: 09/273,524

(22) Filed: Mar. 22, 1999

(65) Prior Publication Data

US 2002/0098305 A1 Jul. 25, 2002

(30) Foreign Application Priority Data

Mar. 20, 1998 (FR) .............................................. 98 03571

(51) Int. Cl.[7] ............................. B65D 88/22; F16L 11/04
(52) U.S. Cl. .................. 428/35.7; 428/36.7; 428/36.91; 428/476.9; 428/516; 428/518; 138/137; 138/141; 220/562; 280/830; 206/0.6
(58) Field of Search ................................ 428/35.7, 36.6, 428/36.7, 36.9, 36.91, 521, 523, 476.9, 516, 518; 138/137, 141; 220/562; 280/830; 206/0.6

(56) References Cited

U.S. PATENT DOCUMENTS

| 4,058,647 | A |   | 11/1977 | Inoue et al. ................. 428/474 |
| 4,254,169 | A |   | 3/1981  | Schroeder .................... 428/35   |
| 4,397,916 | A |   | 8/1983  | Nagano |
| 4,973,625 | A |   | 11/1990 | Deyrup |
| 5,011,720 | A |   | 4/1991  | Jabarin |
| 5,019,433 | A | * | 5/1991  | Briggs et al. ............... 428/35.7 |
| RE34,537  | E |   | 2/1994  | Deyrup ....................... 428/35.7 |
| 5,472,754 | A |   | 12/1995 | Douchet et al. |
| 5,618,599 | A |   | 4/1997  | Nulman et al. ............. 428/36.7 |
| 5,902,655 | A | * | 5/1999  | Matsuoka et al. ........... 428/213 |
| 5,914,164 | A | * | 6/1999  | Ciocca et al. .............. 428/36.7 |
| 6,033,749 | A | * | 3/2000  | Hata et al. ................. 206/524.1 |

FOREIGN PATENT DOCUMENTS

| DE | 26 08 112    |    | 9/1976  |
| EP | 0 016 617 A1 |    | 10/1980 |
| EP | 0 035 392 A1 |    | 9/1981  |
| EP | 0 365 266 A3 |    | 4/1990  |
| EP | 0 365 266 A2 |    | 4/1990  |
| EP | 0 518 354 A1 |    | 2/1992  |
| EP | 0 514 548 A1 |    | 11/1992 |
| EP | 0 638 749 A1 |    | 2/1995  |
| EP | 0 873 863 A2 |    | 10/1998 |
| EP |   873 863 A3 |    | 11/1999 |
| FR | 0 731 308 A1 |    | 9/1996  |
| FR | 0 742 236 A1 |    | 11/1996 |
| GB | 2 280 941 A  |    | 2/1995  |

* cited by examiner

*Primary Examiner*—Rena L. Dye
(74) *Attorney, Agent, or Firm*—Marina V. Schneller; Venable, LLP

(57) ABSTRACT

The invention relates to a multilayer tank or tubing made of a thermoplastic, comprising at least one layer comprising a barrier resin, adjacent to at least one layer consisting of a blend comprising at least one polyolefin and at least one functionalized polyolefin, and the said functionalized polyolefin of which comprises functional monomeric units chosen from carboxylic acids, dicarboxylic acids and the anhydrides corresponding to the said dicarboxylic acids.

25 Claims, No Drawings

FUEL TANK OR TUBING FOR FILLING THIS TANK

The present invention relates to a multilayer fuel tank or to a tubing for filling this tank, made of a thermoplastic.

Plastic extrusion and moulding techniques allow highly diverse articles to be produced, especially hollow bodies which can be used in numerous applications. Many of these applications require the hollow body in question to exhibit good impermeability with respect to the fluid that it is designed to contain. It is therefore well-known to produce multilayer hollow bodies having at least one structural layer made of plastic exhibiting in particular good mechanical properties and at least one layer fulfilling the impermeabilizing function. This layer is generally made of a thermoplastic having the desired barrier properties.

Among thermoplastics which can be used in the structural layer or layers, polyolefins are among the most commonly used. However, it turns out that the usual polyolefins exhibit virtually no adhesion to the usual barrier resins, thereby resulting in articles that have a low delamination resistance. The conventional solution to this problem resides in the use of an adhesive resin layer interposed between the barrier resin layer and the polyolefin layer.

However, adding additional interlayers has certain economical and technical disadvantages, especially given the fact that each type of resin employed requires its own extruder.

BACKGROUND OF THE INVENTION

An attempt at a solution to this problem is given in Patent U.S. Pat. No. 5,618,599 which describes a multilayer comprising a barrier layer and a polyolefin layer, without a separate adhesive layer, and in which the adhesive is preferably mixed with the barrier resin, the adhesive consisting of a polyolefin having a high degree of polycaprolactone or polymethyl methacrylate or polyvinyl acrylate grafting.

However, the adhesion levels obtained in this way are quite low compared with the adhesion levels conventionally obtained by interposing an adhesive layer.

The subject of the present invention is consequently a multilayer fuel tank or a tubing for filling this tank, made of a thermoplastic, without adhesive layers, and having good barrier properties and a high delamination resistance.

SUMMARY OF THE INVENTION

Consequently, the present invention relates to a multilayer fuel tank or a tubing for filling this tank, made of a thermoplastic, comprising at least one layer comprising a barrier resin, adjacent to at least one layer consisting of a blend comprising at least one polyolefin and at least one functionalized polyolefin, which is characterized in that the said functionalized polyolefin comprises functional monomeric units chosen from carboxylic acids, dicarboxylic acids and the anhydrides corresponding to the said dicarboxylic acids.

The expression "multilayer fuel tank or tubing for filling this tank" should be understood to mean any tank or tubing whose wall possesses at least two adjacent layers essentially consisting of different thermoplastics.

The said tank or tubing may be obtained especially by moulding or by coextrusion. In the case of a tank or tubing of finished length, excellent results have been obtained by moulding.

Any type of moulding operation can be used for manufacturing the tank or tubing of finished length according to the invention, as long as it comprises the use of a mould which defines the shape of the tank or of the tubing. This moulding operation may be carried out, for example, starting form a preform or by directly introducing the gelled thermoplastic into the mould.

The moulding operation may also, in particular, be combined with a blowing operation. It may also be followed by a subsequent assembly step, especially by welding. If the moulding operation is carried out starting from a preform, the latter may, especially, be obtained by coextrusion or coinjection.

Very good results have been obtained using coextrusion-blow moulding and coinjection-weld moulding. Preferably, the multilayer tank or tubing is produced by coextrusion-blow moulding. In the latter case, it is possible equally well to use a continuous extrusion technique, an extrusion technique with accumulation or a sequential extrusion technique—techniques all well-known to those skilled in the art.

The term "thermoplastic" should be understood to mean any thermoplastic polymer, including thermoplastic elastomers, as well as their blends. The term "polymer" should be understood to mean both homopolymers and copolymers (especially binary or ternary copolymers), for example random copolymers, copolymers produced by sequential polymerization, block copolymers, graft copolymers, etc.

Any type of barrier resin known to those skilled in the art can be used in the context of the invention, as long as it is a polymer or copolymer compatible with the moulding technique in question. It may also be a blend of various barrier resins. Among the resins that can be used, let us mention especially polyamides or copolyamides, or random ethylene-vinyl alcohol copolymers. Very interesting results have been obtained if the barrier resin is a random ethylene-vinyl alcohol copolymer.

The layer comprising the barrier resin may also contain certain additives well-known to those skilled in the art, which additives may or may not be polymeric, such as stabilizers, lubricants, etc. Advantageously, the layer comprising the barrier resin does not comprise a functionalized polyolefin as defined below.

Preferably, the layer comprising the barrier resin essentially consists of the barrier resin.

In the context of the present invention, the layer comprising the barrier resin is adjacent to at least one layer consisting of a blend comprising at least one polyolefin and at least one functionalized polyolefin.

Apart from the polyolefin or polyolefins and the functionalized polyolefin or polyolefins, the blend may also comprise certain additives well-known to those skilled in the art, which additives may or may not be polymeric, such as stabilizers, lubricants, etc.

Preferably, the said blend essentially consists of at least one polyolefin and of at least one functionalized polyolefin.

The term "polyolefin" should be understood to mean any olefin homopolymer, any copolymer containing at least two different olefins and any copolymer comprising at least 50% by weight of units derived from olefins. Several polyolefins may also be used in the blend. More particularly, the blend may contain a certain proportion of recycled polyolefin as a complement to the virgin polyolefin, or else a certain proportion of a blend of recycled resins coming from the grinding of scrap obtained at various steps in the manufacture of the multilayer tank or tubing.

Preferably, the polyolefin is a polyethylene. Very good results have been obtained with a high-density polyethylene.

The expression "functionalized polyolefin" should be understood to mean any polyolefin comprising, in addition to the units derived from olefins, functional monomeric units. These functional monomeric units may be incorporated into the polyolefin, either in the main chain or in the side chains. They may also be incorporated directly into the backbone of the said main and side chains, for example by copolymerization of one or more functional monomers with the olefin monomer or monomers, or else they may result from grafting one or more functional monomers onto the said chains after the manufacture of the polyolefin. In this case, the polyolefin/functionalized polyolefin blend may be produced especially in a single step, by reactive processing during the gelling step included in the process for manufacturing the tank or tubing.

Several functionalized polyolefins may also be used in the blend.

In the context of the present invention, the functional monomeric units are chosen from carboxylic acids, dicarboxylic acids and the anhydrides corresponding to the said dicarboxylic acids. These units therefore generally come from the copolymerization or from the grafting of at least one unsaturated monomer possessing these same functional groups. As an example of monomers that can be used, let us especially mention acrylic acid, methacrylic acid, maleic acid, fumaric acid, itaconic acid, maleic anhydride, fumaric anhydride and itaconic anhydride. Preferably, the functional monomeric units come from the copolymerization or from the grafting of maleic anhydride.

The functionalized polyolefins thus described are well-known to those skilled in the art and are commercially available.

If the polyolefin is a polyethylene, it is particularly advantageous for the functionalized polyolefin to be a polyethylene grafted by means of maleic anhydride, that is to say the functional monomeric units come from the grafting of maleic anhydride onto a polyethylene.

The Applicant has observed that it was also advantageous for the content of functional monomeric units in the functionalized polyolefin to be at least equal to 0.4% by weight (with respect to the weight of the functionalized polyolefin). More advantageously, this content is at least equal to 0.7% by weight. Even more advantageously, it is at least equal to 1.0% by weight.

Likewise, it is advantageous for the content of functional monomeric units in the functionalized polyolefin to be at most equal to 15% by weight. More advantageously, this content is at most equal to 10% by weight. Even more advantageously, it is at most equal to 5.0% by weight.

In the blend, the content of functionalized polyolefin is preferably greater than or equal to 0.5% by weight. More preferably, it is greater than or equal to 1.5% by weight.

Likewise, the content of functionalized polyolefin in the blend is preferably less than or equal to 20% by weight. More preferably, it is less than or equal to 10% by weight. Even more preferably, it is less than or equal to 7% by weight.

The multilayer tank or tubing according to the invention may optionally comprise one or more additional layers, for example a layer of virgin or recycled polyolefin by itself or a layer made of a blend of virgin and recycled polyolefins. Advantageously, the tank or tubing comprises at least one layer comprising a recycled resin.

Good results have been obtained without interposing additional layers essentially consisting of a resin usually employed as an adhesive.

DETAILED DESCRIPTION OF THE INVENTION

In one particularly advantageous embodiment of the multilayer tank or tubing according to the invention, this consists of three layers—one layer comprising a barrier resin and two adjacent layers, each consisting of a blend comprising at least one polyolefin and at least the functionalized polyolefin as described above.

In another very advantageous embodiment of the multilayer tank or tubing according to the invention, this consists of four layers. These are, from the inside to the outside: (a) a layer consisting of a blend comprising at least one virgin polyolefin and at least the functionalized polyolefin, (b) a layer comprising a barrier resin, (c) a layer consisting of a blend comprising at least the functionalized polyolefin and a recycled polyolefin, it being possible for the latter to come especially from the grinding of scrap obtained at various steps in the manufacture of the multilayer tank or tubing, and (d) a layer comprising a virgin polyolefin.

In the examples below, Examples 1R, 2R and 9R are reference examples, not according to the invention. The other examples illustrate in a non-limiting manner various particular embodiments of the invention.

In the examples, we employ the following conventional terms:
PE: polyethylene;
HDPE: high-density polyethylene;
MA: maleic anhydride;
MA-gPE: polyethylene grafted by means of maleic anhydride;
EVOH: random ethylene-vinyl alcohol copolymer;
PA: polyamide;
petrol of the MO type: "CEC legislative fuel RF08-A-85" according to the name used by the firm Haltermann GmbH;
petrol of the TF1 type: a blend of 90% by volume of MO-type petrol and 10% of ethanol;
unless otherwise indicated, the compositions are given in percentages by weight.

EXAMPLE 1R

Three-layer bottles having a capacity of 1 liter were produced by coextrusion-blow moulding using a BEKUM® BM303 machine. The extrusion temperatures for each layer were 226±1° C. The characteristics of these three layers were as follows:
inner layer and outer layer: ELTEX® RS B 714, a HDPE from Solvay Polyolefins Europe—Belgium, having a Melt Index of 0.15 g/10 min. (5.0 kg/190° C.), average thickness: approximately 1100 μm;
central layer: a blend comprising 96.5% of EVAL® EP-F 101A EVOH and 3.5% of a first type of MA-gPE, containing 1.2% MA and having a Melt Index of 1 to 2 g/10 min. (2.16 kg/190° C.), average thickness: approximately 165 μm.

The adhesion between the HDPE layers and the central layer was measured on 15 mm wide specimens cut longitudinally in the wall of the bottles. The measurement was carried out according to the ASTM Standard D1876 (1995 version), using a tensile pull rate of 100 mm/minute and by taking an average, on three specimens per product.

The adhesion was also measured after the bottle had been filled, and kept for 6 months at 40° C., with a standardized TF1-type petrol.

For some of the following examples, the permeability of the bottles to this same petrol, or to a standardized petrol without ethanol (M0 type), was also measured by weight loss during the storage at 40° C.

EXAMPLE 2R

Example 1R was repeated, apart from the fact that the central layer contained 50% of the same MA-gPE.

EXAMPLE 3

Example IR was repeated, apart from the fact that the central layer did not contain MA-gPE and that the two HDPE layers each contained 3.5% of a second type of MA-gPE, containing from 0.1 to 0.2% MA and having a Melt Index of 1 to 1.4 g/10 min. (2.16 kg/190° C.).

EXAMPLE 4

Example 3 was repeated, apart from the fact that the two HDPE layers each contained 3.5% of a third type of MA-gPE, containing 0.4% MA and having a Melt Index of 1.5 g/10 min. (2.16 kg/190° C.).

EXAMPLE 5

Example 3 was repeated, apart from the fact that the two HDPE layers each contained 3.5% of a fourth type of MA-gPE, containing 0.7% MA and having a Melt Index of 0.2 g/10 min. (2.16 kg/190° C.).

EXAMPLE 6

Example 3 was repeated, apart from the fact that the two HDPE layers each contained 3.5% of the first type of MA-gPE.

EXAMPLE 7

Example 3 was repeated, apart from the fact that the two HDPE layers each contained 3.5% of a fifth type of MA-gPE, containing 1.7% MA and having a Melt Index of 0.2 g/10 min. (5.0 kg/190° C.).

EXAMPLE 8

Two-layer bottles having a capacity of 1 liter were produced by coextrusion-blow moulding using a BEKUM® BM303 machine. The characteristics of these layers were as follows:

- outer layer: a blend comprising 96.5% of HDPE (the same type as for the previous examples) and 3.5% of the first type of MA-gPE, average thickness: approximately 1500 μm, extrusion temperature: 240° C.;
- inner layer: PA (obtained by separating out the PA granules from a blend of granules of a SELAR® RB920 resin), average thickness: approximately 520 μm, extrusion temperature: 255° C.

The adhesion between the HDPE layer and the PA layer was measured as in the case of the above examples, except that the tensile pull rate was 50 mm/min. The permeability was measured as in the case of the above examples.

EXAMPLE 9R

Three-layer bottles having a capacity of 1 liter were produced by coextrusion-blow moulding using a BEKUM® BM303 machine. The characteristics of these layers were as follows:

- outer layer: HDPE (the same type as in the case of the previous examples), average thickness: approximately 1500 μm, extrusion temperature: 240° C.;
- interlayer: an adhesive layer essentially consisting of the first type of MA-gPE, average thickness: 250 μm, extrusion temperature: 210° C.;
- inner layer: PA (the same type as in Example 8), average thickness: approximately 160 μm, extrusion temperature: 255° C.

The adhesion and the permeability were measured as in the case of Example 8.

EXAMPLE 10

A three-layer tube with an outside diameter of 32 mm was coextruded at a material temperature of 215° C. The characteristics of these layers were as follows:

- inner layer: a blend comprising 96.5% of ELTEX® TUB171, an HDPE from Solvay Polyolefins Europe—Belgium, having a Melt Index of 0.85 g/10 min. (5.0 kg/190° C.) and containing 3.5% of the fifth type of MA-gPE (cf. Example 7), average thickness: approximately 1310 μm;
- central layer: EVAL® EP-F 101A EVOH, average thickness: approximately 120 μm;
- outer layer: the same type as the inner layer, average thickness: approximately 1240 μm.

Sections 75 cm in length were cut from this tube and, with the ends blocked off, filled to 90% with M0- or TF1-type petrol. The permeability of the tube was measured by weight loss at 40° C. The adhesion between the inner HDPE layer and the barrier layer was measured in the same way as in the case of Examples 1R to 7 (before contact with petrol). Other sections were filled to 50% with M0-type petrol and thus maintained at 40° C. for 3 months. Specimens of the wall of these sections were removed both from the lower region, in contact with the liquid, and from the upper region, in contact with the petrol vapour, and subjected to adhesion measurements as above.

EXAMPLE 11

A three-layer tube with an outside diameter of 32 mm was coextruded at a material temperature of 215° C. The characteristics of these layers were as follows:

- inner layer: a blend comprising 80% of HOSTALEN® GM9350C HDPE, having a Melt Index of 0.2 g/10 min. (21.6 kg/190° C.), with a carbon black content of 10% and 20% of the fifth type of MA-gPE (cf. Examples 7 and 10), average thickness: approximately 1360 μm;
- central layer: EVAL® EP-F 101A EVOH, average thickness: approximately 130 μm;
- outer layer: the same type as the outer layer of Example 10, average thickness: approximately 1390 μm.

The adhesion and the permeability were measured as in the case of the previous example.

The following table gives the results obtained:

| Example | MA-gPE in: | MA content of the Ma-gPE (% by weight) | HDPE/barrier adhesion (kN/m) | Adhesion after contact with petrol (kN/m) | Permeability to TF1 petrol (mg/day) | Permeability to M0 petrol (mg/day) |
|---|---|---|---|---|---|---|
| 1R | EVOH | 1.2 | <0.25[a] | | | |
| 2R | EVOH | 1.2 (50% of MA-gPE) | 0.25 | | | |
| 3 | HDPE | 0.1 to 0.2 | 0.5 | | 39.6 | 6.2 |
| 4 | HDPE | 0.4 | 1.2 | | | |
| 5 | HDPE | 0.7 | 2.1 | | | |
| 6 | HDPE | 1.2 | 3.3 | 2.1[d] | 34.6 | |
| 7 | HDPE | 1.7 | >2.5[b] | | | |
| 8 | HDPE | 1.2 | 4.1[c] | | | 11.3 |
| 9R | interlayer | 1.2 | 2.4[c] | | | |
| 10 | HDPE | 1.7 | 3.4 | 3.7 (vapour)[e]<br>2.7 (liquid)[e] | 80 | 25 |
| 11 | HDPE | 1.7 (20% of MA-gPE) | 5.6 | 6.4 (vapour)[e]<br>4.4 (liquid)[e] | 81 | 22 |

[a]Insufficient adhesion to be able to be measured;
[b]The test pieces could not be delaminated: cohesive failure at the HDPE layer;
[c]Tensile pull rate: 50 mm/min.;
[d]TF1-type petrol;
[e]M0-type petrol.

What is claimed is:

1. Multilayer fuel tank or tubing for filling said tank, made of a thermoplastic, comprising a hollow body, produced by coextrusion-blow moulding and consisting of four layers, which are defined as a), b), c), and d) from the inside to the outside:
    a) one layer is a blend comprising at least one polyolefin and at least one functionalized polyolefin, wherein the said functionalized polyolefin comprises functional monomeric units selected from the group consisting of carboxylic acids, dicarboxylic acids and the anhydrides thereof, and
    b) a barrier layer, made of a polyamide, a random ethylene-vinyl alcohol copolymer or a blend of a polyamide and a random ethylene-vinyl alcohol copolymer, wherein layer a) is bonded directly to said barrier layer;
    c) a third layer is a second blend comprising at least the functionalized polyolefin and a recycled polyolefin which comes from the grinding of scrap obtained at various steps in the manufacture of the multilayer fuel tank or tubing; and
    d) a fourth layer comprising a virgin polyolefin.

2. Multilayer tank or tubing according to claim 1, produced by coextrusion-blow moulding.

3. Multilayer tank or tubing according to claim 1, in which the barrier resin is a random ethylene-vinyl alcohol copolymer.

4. Multilayer tank or tubing according to claim 1, in which the polyolefin is a high-density polyethylene.

5. Multilayer tank or tubing according to claim 1, in which the functional monomeric units are units of maleic anhydride.

6. Multilayer tank or tubing according to claim 5, in which the polyolefin is a polyethylene and in which the functionalized polyolefin comprises polyethylene units of maleic anhydride.

7. Multilayer tank or tubing according to claim 1, in which the content of functionalized monomeric units in the functionalized polyolefin is greater than or equal to 0.7% by weight and less than or equal to 15% by weight.

8. Multilayer tank or tubing according to claim 1, in which the content of functionalized polyolefin in the blend is greater than or equal to 0.5% by weight and less than or equal to 20% by weight.

9. Multilayer tank or tubing according to claim 1, intended to be fitted to a motor vehicle.

10. Multilayer fuel tank, made of a thermoplastic, comprising a hollow body, produced by coextrusion-blow moulding and consisting of four layers, which are defined as a), b), c), and d) from the inside to the outside:
    a) one layer is a blend comprising at least one polyolefin and at least one functionalized polyolefin, wherein the said functionalized polyolefin comprises functional monomeric units selected from the group consisting of carboxylic acids, dicarboxylic acids and the anhydrides thereof, and
    b) a barrier layer, made of a polyamide, a random ethylene-vinyl alcohol copolymer or a blend of a polyamide and a random ethylene-vinyl alcohol copolymer, wherein layer a) is bonded directly to said barrier layer;
    c) a third layer is a second blend comprising at least the functionalized polyolefin and a recycled polyolefin which comes from the grinding of scrap obtained at various steps in the manufacture of the multilayer fuel tank; and
    d) a fourth layer comprising a virgin polyolefin.

11. Multilayer tank according to claim 10, in which the barrier layer is a random ethylene-vinyl alcohol copolymer.

12. Multilayer tank according to claim 10, in which the polyolefin is a high-density polyethylene.

13. Multilayer tank according to claim 10, in which the functional monomeric units are units of maleic anhydride.

14. Multilayer tank according to claim 13, in which the polyolefin is a polyethylene and in which the functionalized polyolefin comprises polyethylene units of maleic anhydride.

15. Multilayer tank according to claim 10, in which the content of functional monomeric units in the functionalized polyolefin is greater than or equal to 0.7% by weight and less than equal to 15% by weight.

16. Multilayer tank according to claim 10, in which the content of functionalized polyolefin in the blend is greater than or equal to 0.5% by weight and less than or equal to 20% by weight.

17. Multilayer tank according to claim 10, intended to be fitted to a motor vehicle.

18. Multilayer tubing for filling a fuel tank, made of a thermoplastic, comprising a hollow body, produced by coextrusion-blow moulding and consisting of four layers, which are defined as a), b), c), and d) from the inside to the outside:
  a) one layer is a blend comprising at least one polyolefin and at least one functionalized polyolefin, wherein the said functionalized polyolefin comprises functional monomeric units selected from the group consisting of carboxylic acids, dicarboxylic acids and the anhydrides thereof, and
  b) a barrier layer, made of a polyamide, a random ethylene-vinyl alcohol copolymer or a blend of a polyamide and a random ethylene-vinyl alcohol copolymer, wherein layer a) is bonded directly to said barrier layer;
  c) a third layer is a second blend comprising at least the functionalized polyolefin and a recycled polyolefin which comes from the grinding of scrap obtained at various steps in the manufacture of the tubing; and
  d) a fourth layer comprising a virgin polyolefin.

19. Multilayer tubing according to claim 18, in which the barrier layer is a random ethylene-vinyl alcohol polymer.

20. Multilayer tubing according to claim 18, in which the polyolefin is a high-density polyethylene.

21. Mulilayer tubing according to claim 18, in which the functional monomeric units are units of maleic anhydride.

22. Multilayer tubing according to claim 21, in which the polyolefin is a polyethylene and in which the functionalized polyolefin comprises polyethylene units of maleic anhydride.

23. Multilayer tubing according to claim 18, in which the content of functional monomeric units in the functionalized polyolefin is greater than or equal to 0.7% by weight and less than or equal to 15% by weight.

24. Multilayer tubing according to claim 18, in which the content of functionalized polyolefin in the blend is greater than or equal to 0.5% by weight and less than or equal to 20% by weight.

25. Multilayer tank according to claim 18, intended to be fitted to a motor vehicle.

* * * * *